Dec. 4, 1923.

H. THUN

MACHINE FOR MEASURING SURFACE AREAS

Filed June 21, 1922

1,476,428

Inventor:
Hermann Thun,
By Kriegh & Brown
Attys

Patented Dec. 4, 1923.

1,476,428

UNITED STATES PATENT OFFICE.

HERMANN THUN, OF ESSEN, GERMANY, ASSIGNOR TO FRIED. KRUPP AKTIENGESELL-SCHAFT, OF ESSEN-ON-THE-RUHR, GERMANY.

MACHINE FOR MEASURING SURFACE AREAS.

Application filed June 21, 1922. Serial No. 569,893.

*To all whom it may concern:*

Be it known that I, HERMANN THUN, residing at Essen, Germany, a citizen of the German Republic, have invented a certain new and useful Improvement in Machines for Measuring Surface Areas, of which the following is a specification.

This invention relates to machines for measuring surface areas, more particularly designed for measuring the superficial area of leather and being of a kind comprising a plurality of equidistantly arranged contact wheels or feelers which are adapted to actuate measuring members when they are lifted from a driving drum by the article to be measured.

It is a well-known fact that in surface measuring machines of the kind stated, there is involved an error, the so-called "error of breadth" which depends on the breadth of the contact wheels or feelers. This error can be substantially eliminated by having each two neighbouring contact wheels or feelers connected with one measuring member. With such construction, however, a certain space exists between the two contact wheels or feelers acting on a measuring member, this space entailing another error. This error consists in that, if the surface to be measured has an oblique edge, the release of a measuring member will not, as it should be for avoiding every possible error, take place at the moment at which coincide the points of intersection of the respective edge with the line of touch between the driving drum and the contact wheels or feelers on the one hand and the plane standing vertical with relation to this line of touch in the middle between the two contact wheels or feelers acting on the respective measuring member on the other hand, but said release will only take place when the second of the two contact wheels is lifted by the article to be measured. The release of the respective measuring member will therefore take place too late, so that the measuring result will be too small.

Now, the invention has for its object to provide a machine for measuring surface areas which, although simple in construction, avoids the said error.

The accompanying drawing illustrates, by way of example, an embodiment of the subject-matter of the invention.

Figure 1:
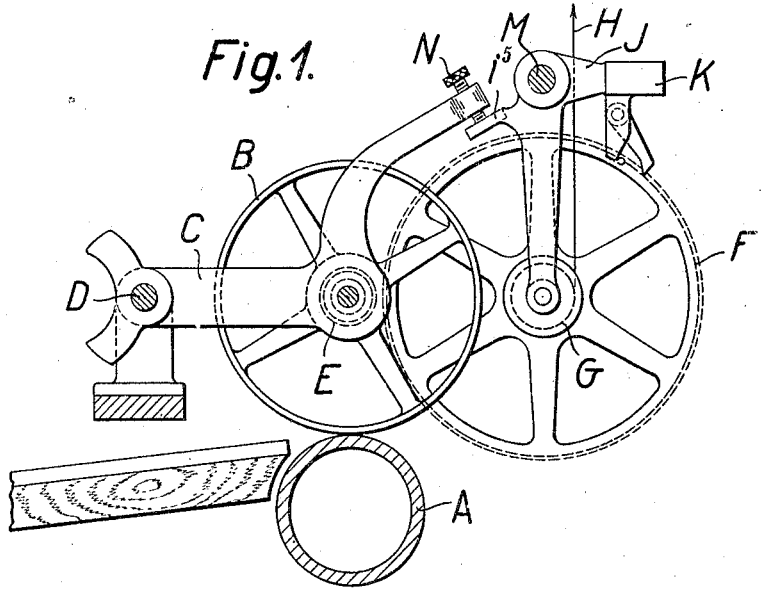
Figure 2:
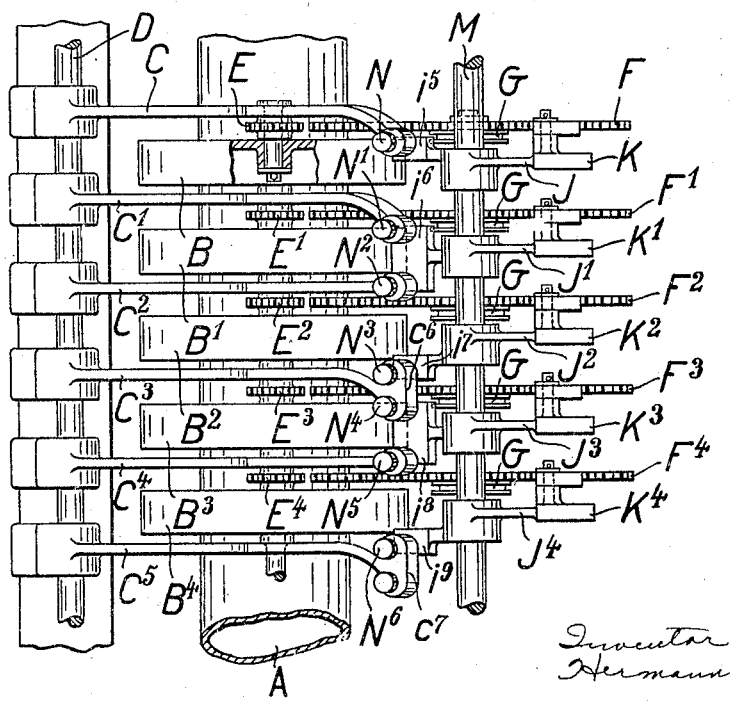

Fig. 1 is a cross-section of the machine, the parts having no bearing on the invention being omitted; and Fig. 2 is a plan view corresponding to Fig. 1, partly in section.

Referring now to the drawing, A is the driving drum on which rest in equal distances beside one another contact wheels B, $B^1$, $B^2$ ..., B representing the first contact wheel of the machine. The contact wheels are mounted for rotation on levers C, $C^1$, $C^2$ ... which are adapted to rock on a fixed shaft D and which carry each, besides one contact wheel, a pinion E, $E^1$, $E^2$ ... rigidly connected with the contact wheel. Arranged oppositely to each pinion is a measuring member formed by a spur wheel F, $F^1$, $F^2$ ... which, when rotated in a well-known manner, will act on an adding mechanism through the intermediary of a roller G rigidly fastened to it and a measuring band H which is adapted to be wound on the roller G. The spur wheels F, $F^1$, $F^2$ ... are rotatively mounted each at one arm of a double-armed lever J, $J^1$, $J^2$ ... the other arm of which carries a weight K, $K^1$, $K^2$ ... The levers J, $J^1$ ... are mounted for oscillation on a fixed shaft M, the weights K, $K^1$ ... tending to throw the spur wheels F, $F^1$ ... into engagement with the corresponding pinions E, $E^1$ ... In the position of the several parts illustrated in the drawing this is, however, prevented by the arrangement hereinafter described.

The free ends of the levers C, $C^1$ and $C^2$ carrying the first, second and third contact wheel are provided each with a setting screw N, $N^1$ and $N^2$. Bearing against the setting screw N under the influence of the weight K is an L-shaped projection $i^5$ of the lever J. The setting screw N is adjusted so as to cause the spur wheel F to be just out of engagement with the pinion E. Bearing against the setting screw $N^1$ under the influence of the weight $K^1$ is a T-shaped projection $i^6$ of the lever $J^1$. The projection $i^6$ not only bears against the setting screw $N^1$ but also against the setting screw $N^2$. The setting screws $N^1$ and $N^2$ are adjusted like the setting screw N so as to cause the spur wheel $F^1$ to be just out of engagement with the pinion $E^1$. The lever $J^2$ possesses an L-shaped projection $i^7$ which bears against a setting screw $N^3$ under the influence of the weight $K^2$, the screw $N^3$ being mounted in a head $c^6$ forming the free end of the lever $C^3$. The head $c^6$ also carries another setting screw $N^4$ against which bears a T-shaped projection $i^8$ of the lever $J^3$ under the action of the weight $K^3$. The projection $i^8$ likewise bears still against another setting screw $N^5$ which is adjustably mounted in the free end of the lever $C^4$. The setting screws $N^4$ and $N^5$ are in turn adjusted so as to cause the spur wheel $F^3$ to be just out of engagement with the pinion $E^3$. The lever $J^4$ again possesses an L-shaped projection $i^9$. Same is caused by the action of the weight $K^4$ to bear against a setting screw $N^6$ which is mounted in a head $c^7$ forming the free end of the lever $C^5$ and which is adjusted in the same manner as the other setting screws. As will be evident from the foregoing, the spur wheels $F$, $F^2$, $F^4$ are only in engagement each with one contact wheel $B$, $B^3$ and the contact wheel (not shown) which is carried by the lever $C^5$, while the spur wheels $F^1$, $F^3$ are each adapted to be acted upon by two contact wheels $B^1$ $B^2$ and $B^3$ $B^4$. The arrangement is made in this way throughout the entire machine so that the measuring members are alternately in connection with one or two contact wheels, respectively. The measuring movement of the twice-connected measuring members can therefore only be initiated when two neighbouring contact wheels will come into contact with the surface to be measured. The error of breadth is thus compensated, but as already set forth in the introductory matter of the specification, another error is involved which causes the measuring result to be too small. If the contact wheels are of a breadth equal to the distance between them such as is the case with the embodiment shown, the said error will be equal to the error of breadth but opposed to the same. The measuring movement of the other half of the measuring members will now be initiated when the one corresponding contact wheel will enter into contact with the surface to be measured. This portion of the measuring members will therefore be thrown in too early in accordance with the error of breadth. As a result thereof, these measuring members will entirely balance the error caused by the other measuring members.

As will be understood from the foregoing, the number of the measuring members which are in connection with only one contact wheel, depends upon the proportion between the breadth of the contact wheels and the breadth of the spaces lying between the same. If the contact wheel would, for instance, be five times as broad as the free spaces between them, the first, seventh, thirteenth etc. measuring member would each have to be acted upon by one contact wheel, while all of the other measuring members of which a number five times as large is present would have to be acted upon by two contact wheels each.

Claims:

1. In a machine for measuring surface areas comprising a driving drum for guiding the article to be measured, equidistantly spaced feelers normally resting on said drum, and measuring members adapted to be actuated by said feelers when the same are lifted from the drum by the article to be measured, a portion of the said measuring members being connected with one feeler each and a portion of them being connected with two feelers each, the dually operated members being proportioned to the singly operated members substantially according to the proportion of the breadth of the feelers to the breadth of their spaced intervals.

2. In a machine for measuring surface areas comprising a driving drum for guiding the article to be measured, equi-distantly spaced feelers normally resting on said drum, a pinion coaxial with each of said feelers and adapted to rotate therewith, means for swingingly supporting said feelers, measuring members adapted to engage said feelers, means for bringing said measuring members into engagement with said pinions when said feelers are in working position, a portion of said measuring members being operable by one of said feelers each and the remainder being operable by two of said feelers each, the dually operated members being proportioned to the singly operated members according to the proportion of the breadth of the feelers to the breadth of their spaced intervals.

The foregoing specification signed at Essen, Germany, this 24th day of May, 1922.

HERMANN THUN.